(12) United States Patent
Fenn et al.

(10) Patent No.: US 6,253,661 B1
(45) Date of Patent: Jul. 3, 2001

(54) PISTON ROD GUIDE FOR A PISTON-CYLINDER UNIT

(75) Inventors: Gerald Fenn, Pfersdof; Hassan Asadi, Schweinfurt, both of (DE)

(73) Assignee: Mannesman Sachs AG, Schweinfurt (DE)

( * ) Notice: Subject to any disclaimer, the term of this patent is extended or adjusted under 35 U.S.C. 154(b) by 0 days.

(21) Appl. No.: 09/304,815

(22) Filed: May 4, 1999

(30) Foreign Application Priority Data

May 4, 1998 (DE) .............................................. 198 19 827

(51) Int. Cl.⁷ ...................................................... F16J 15/18
(52) U.S. Cl. ............................................................ 92/165 R
(58) Field of Search .................................. 92/165 R, 166, 92/168; 188/322.16, 322.17

(56) References Cited

U.S. PATENT DOCUMENTS 5,533,598   7/1996   Adrian et al. .................... 188/322.17

FOREIGN PATENT DOCUMENTS

| 42 07 099 C1 | 3/1992 | (DE) . | |
| 42 07 053 | 9/1993 | (DE) | F16F/9/36 |
| 42 07 099 | 9/1993 | (DE) | F16F/9/36 |
| 44 36 907 | 4/1996 | (DE) | F16J/10/02 |
| 0 535 409 | 9/1992 | (EP) | B60G/15/07 |
| 0 733 823 | 9/1996 | (EP) . | |

Primary Examiner—John E. Ryznic
(74) Attorney, Agent, or Firm—Cohen, Pontani, Lieberman & Pavane

(57) ABSTRACT

A sheet-metal piston rod guide for a piston-cylinder unit in which a piston rod is axially movable, includes a slide bush which is centered by a guide sleeve which adjoins a closure ring which delimits the working chamber and in turn merges into an axial casing. The axial casing centers the entire piston rod guide. A piston rod seal surrounds the piston rod and seals the working chamber. The guide sleeve is supported in the axial and radial directions against a bearing ring which bears the piston rod seal and extends in the radial direction. The bearing ring has a radial support surface with respect to the casing so that the casing, the closure ring, the guide sleeve, and the bearing ring form a force bearing arrangement which is closed with regard to the bearing of forces.

11 Claims, 4 Drawing Sheets

PISTON ROD GUIDE FOR A PISTON-CYLINDER UNIT

BACKGROUND OF THE INVENTION

1. Field of the Invention

The present invention relates to a piston rod guide for axially slidably guiding a piston rod of a piston-cylinder unit.

2. Description of the Related Art

Prior art piston rod guides are known which are made from sintered materials. Replacements for the sintered material in piston rod guides for piston-cylinder units are increasingly being sought after, since the porosity of the sintered material requires that the piston rod guide be sealed over its entire surface with respect to the working chamber. For example, machined aluminum guides are in general use, but these guides are provided with a coating to maintain an acceptable wear performance. However, this coating has an adverse effect on the coefficients of friction.

Slide bushes have been used as a measure to counteract the less satisfactory coefficients of friction of the aluminum guide. There are two main designs of these slide bushes which differ in the position of the slide bush with respect to the piston rod seal. In a first design, the slide bush lies on a side of the piston rod seal away from the working chamber to be sealed. Although the structure of the piston rod guide is relatively simple, it is impossible for any entrained oil to reach the slide bush, and consequently the slide bush becomes worn relatively quickly, particularly in the event of transverse forces. A remedy to this is provided by an entrained oil duct, which guides controlled volumes of oil to the slide bush. However, the entrained oil duct in turn involves increased construction outlay. Reference is made, for example, to German reference DE 44 36 907 A1, which discloses a two-part piston rod guide made from sheet metal.

In principle, the fiction performance is better with a second design of piston rod guides in which the slide bush is arranged between the piston rod seal and the working chamber to be sealed. By way of example, German reference DE 42 07 099 A1 is cited, in which two annular shaped parts form a guide closure. One of the two annular shaped parts, in half section, has a U-shaped profile which forms an entrained oil duct. The second annular shaped part is designed as a multiple stepped cap and is in contact by means of an overlap in the area of the external diameters of the two annular shaped parts. There are two drawbacks associated with this design. Firstly, the guide bush is rather elastic in the transverse direction, and secondly the position of the piston rod seal is not clearly defined, since the cap of the second annular shaped part provides a bearing surface on only one axial side.

A modification to this design is described in German reference DE 42 07 053 A1, but this modification exhibits the same drawbacks described above.

SUMMARY OF THE INVENTION

The object of the present invention is to provide a sheet-metal piston rod seal which is optimized with regard to stability in the axial and transverse directions.

According to the invention, the object is achieved by a sheet-metal piston rod guide for a piston-cylinder unit in which a piston rod is axially movably arrangable, said sheet-metal piston rod guide comprising a casing for centering said piston rod guide in the piston-cylinder unit in which said piston rod guide is to be arranged, said casing having a first axial end connected to an axially extending closure ring and a second axial end, a guide sleeve adjoining a radially inner portion of said closure ring and having a slide bush centered by said guide sleeve, a piston rod seal for sealing a working chamber of the piston-cylinder unit in which said piston rod guide is to be aranged, and a bearing ring radially extending between said guide sleeve and said casing for axially and radially supporting said guide sleeve and bearing said piston rod seal, wherein an interconnection of said bearing ring, said casing, said closure ring, and said guide sleeve comprises a closed force bearing arrangement of said piston rod guide.

Despite the use of sheet metal as the base material for the supporting part of the piston rod guide, a high level of rigidity which is comparable to that of a solid design is achieved while exploiting the cost benefit provided by a sheet-metal solution. The closed force bearing arrangement of the piston rod guide may be used as an entrained oil duct if the piston rod guide is used in a vibration absorber.

Furthermore, according to the invention, or in combination with the inventive idea described, there is provision for one annular shaped part to include the casing and to have an end face which is supported axially on the cylinder and integrally encompassing the closure ring. The integral design makes the component which has to absorb the greatest forces particularly stable. Any weld points or clamped connections are dispensed with and therefore do not present any potential problems.

A particularly sturdy structure is achieved if the end face of the annular component is extended into a radial cover against which the piston rod seal bears.

To optimize the forming outlay on the sheet-metal body, particularly with regard to the sheet-metal forming tools, the piston rod guide may comprise two annular shaped parts.

In a first embodiment, a first annular shaped part comprises the closure ring, the casing, and the guide sleeve and a second annular part comprises the bearing ring. This circumvents the operation of closing the force bearing arrangement by deforming the bearing ring. The operation of deforming the bearing ring to be assessed for each individual case, for small batches, with regard to the tooling cost.

In addition, the bearing ring may be formed by a second annular shaped part. In the simplest design, the bearing ring may be designed as a simple disk.

In a further advantageous configuration, the bearing ring has an axially extending centering ring which bears against the first annular shaped part. The centering ring additionally performs a holding function, to ensure that the bearing ring does not tilt and is not installed in a skew position.

In order to intensify this action further, the centering ring bears against the casing of the first annular shaped part. The casing has the largest radial dimension and thus provides the best holding option.

As an alternative, the second annular shaped part may be U-shaped in cross section with one side of the second annular shaped part forming the bearing ring and one side forming the guide sleeve.

To further improve the positional stability of the bearing ring, the bearing ring may be supported in the axial direction against the closure disk of the first annular shaped part.

In order for pressure to be supplied to the piston rod seal for prestressing the latter, the second annular shaped part has an encircling channel, the boundary surfaces of which assume a centering function with respect to the guide sleeve of the first annular shaped part.

With a view to obtaining a correctly oriented position of the slide bush, the bearing ring projects radially inward beyond the guide sleeve such that the projection forms a bearing surface for the slide bush.

As a further possibility for supporting the bearing ring, there is provision for the casing to have a radially inwardly directed depression for forming a rest plane for the second annular shaped part.

In order to achieve a rest plane which is as large as possible, the inwardly directed depression of the casing are designed as a continuous bead. The continuous bead has a dual function, in that the inwardly directed, continuous bead also accommodates a cylinder seal which seals the working chamber in the area of the piston rod guide.

According to a further advantageous feature, the first annular shaped part has at least one further radially inwardly directed depression, which fixes the second annular shaped part on the rest plane of the first annular shaped part. In this way, the two annular shaped parts are undetachably joined together even before fitting of the piston rod guide has been concluded.

In a further configuration, the further radially inwardly directed indentation is also designed as a bead, so that at least sections of the wall of the cylinder can be deformed into the further indentation, so that there is a connection between the piston rod guide and the cylinder.

In view of the axial and radial forces which are active, the wall thickness of the first annular shaped part may be greater than the wall thickness of the second annular shaped part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
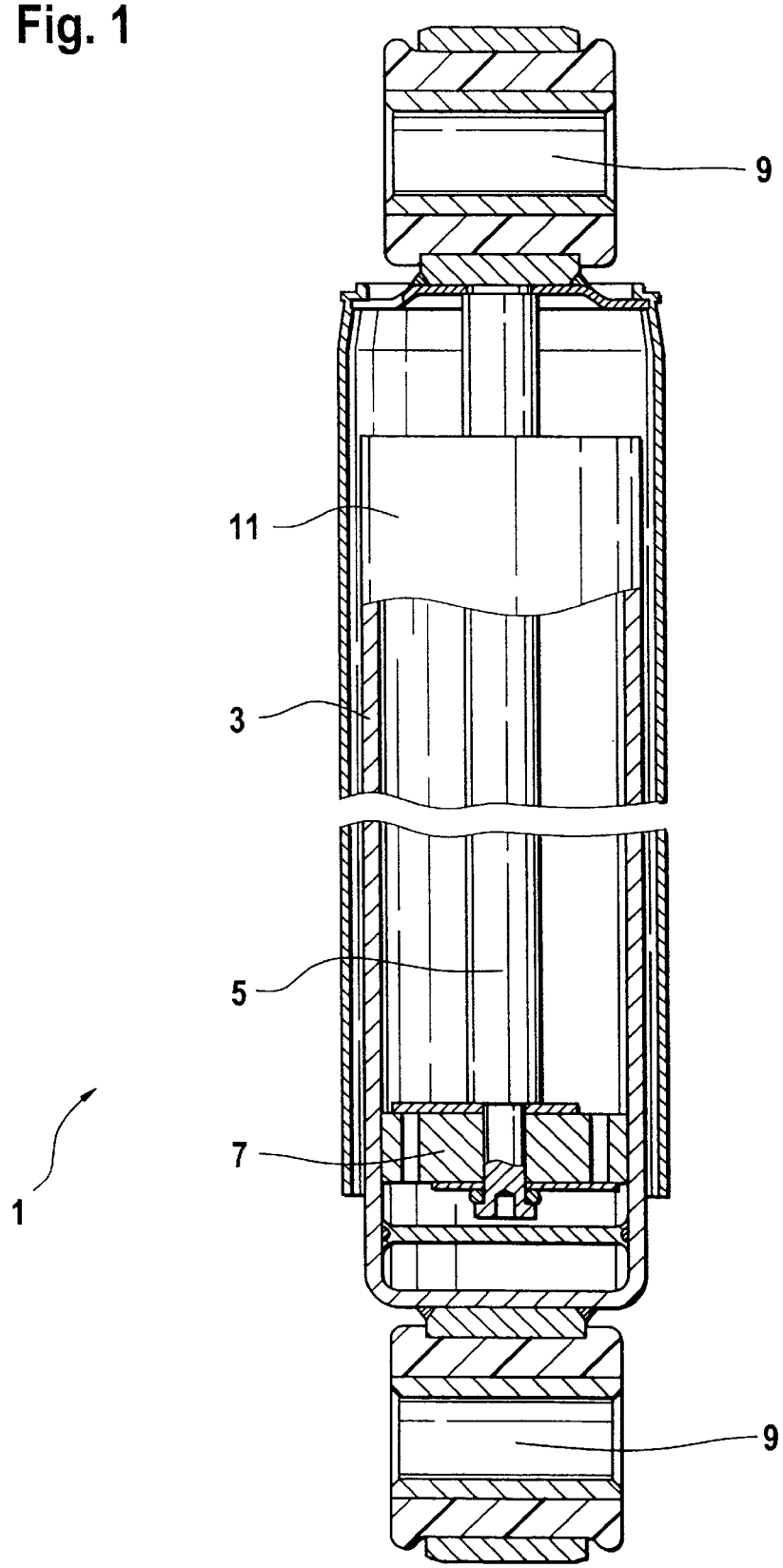
FIG. 1 shows a simplified overall view of the piston-cylinder unit in which the piston rid guide according to the present invention is arranged.

A piston-cylinder unit 1 shown in FIG. 1 is designed as a single-tube shock absorber including an axially movable piston rod 5 with a piston 7 arranged inside a cylinder 3. Suitable connections, in the form of attachment eyelets 9, are arranged on the piston rod 5 and the cylinder 3 for the piston-cylinder unit 1 to be attached. A piston rod guide 11, which is only shown as a theoretical outline, radially positions and guides the piston rod 5 relative to the cylinder 3.

Figure 2:
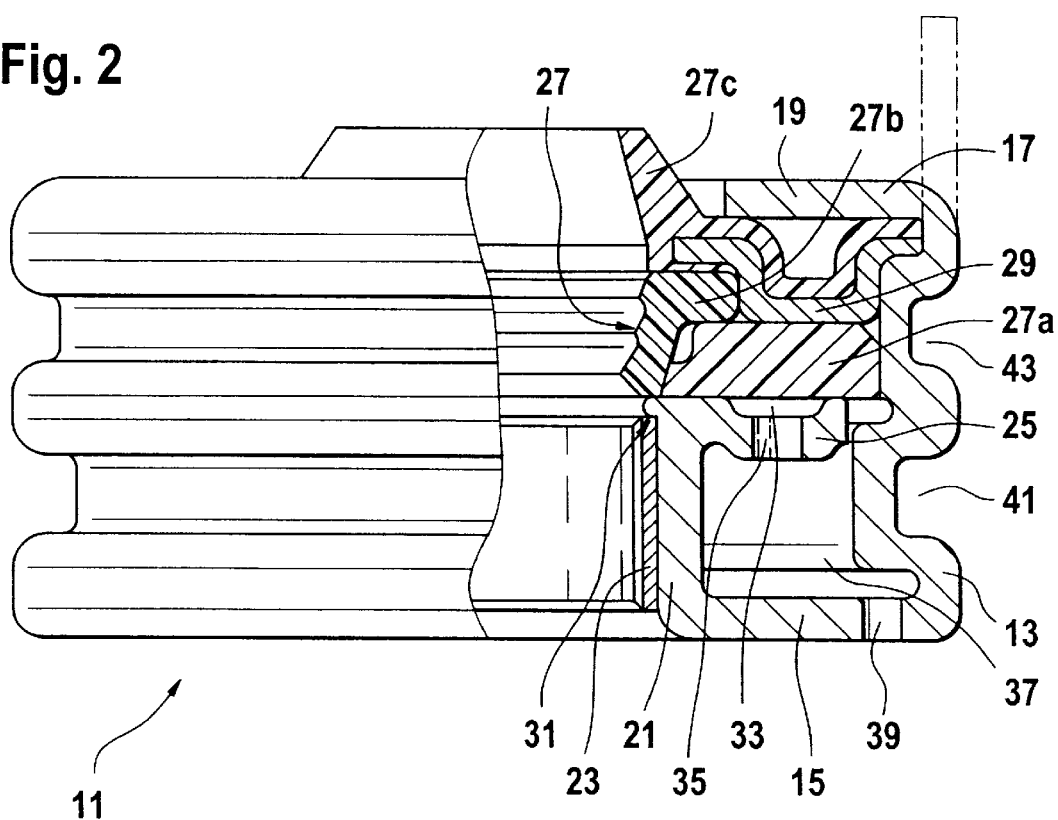
FIG. 2 shows a partial cross-sectional view of an embodiment of the piston rod guide of FIG. 1.

FIG. 2 shows a first embodiment of the piston rod guide 11 as an individual component. The piston rod guide 11, which is formed from sheet metal, comprises an annular shaped part 60 including a casing 13 which centers the piston rod guide 11 as a whole in the piston-cylinder unit. The casing 13 extends from a closure ring 15 on one axial side to an end face 17 on the other axial side of the annular shaped part 60. The end face 17 may be extended to form a cover 19.

The annular shaped part 60 also includes an integrally formed guide sleeve 21 on the internal diameter of the closure ring 15. The guide sleeve 21 extends in the axial direction of the piston rod guide 11 and bears a slide bush 23 which forms a slideway for the piston rod. A bearing ring 25 forms an extension of the guide sleeve 21 in the radially outward direction. The bearing ring 25 is supported against an internal diameter of the casing 13. As a result, the slide bush 23 and guide sleeve 21 transmit transverse forces to the casing 13 via the bearing ring 25 and the closure ring 15. A closed force bearing arrangement 70 is formed by the interconnection of the casing 13, the closure ring 15, the guide sleeve 21, and the bearing ring 25 which bears transverse and axial forces exerted on the piston cylinder unit 1.

A piston rod seal 27, comprising a sealing disk 27a, a rod seal 27b and a stripper 27c, is arranged between the bearing ring 25 and the cover 19. The top side of the piston rod seal 27b bears against the cover 19 and is thus braced. A reinforcement 29 between the piston rod seal 27b and the sealing disk 27a protects the piston rod seal 27b and allows compressive force to be transmitted from the closure ring 15 to the cover 19. The force is transmitted through the guide sleeve 21, to the bearing ring 25, which, via the reinforcement 29, transmits the load to the cover 19.

To further optimize the individual sections of the piston rod guide 11, some shaped additions and deformations are made. For example, the bearing ring 25 forms a projection 31 beyond the guide sleeve 21, so that the slide bush 23 is secured in the axial direction. Furthermore, the bearing ring 25 has an encircling channel 33 between the radial ends thereof with at least one connection opening 35 between the underside of the piston rod guide and an entrained oil duct 37 which is enclosed by the casing 13, the closure ring 15, the guide sleeve 21 and the bearing ring 25. The entrained oil duct 37 having a connection 39 to the working chamber of the piston-cylinder unit of FIG. 1. The connection 39 is preferably arranged proximate a radially outer edge of the closure ring 15 so that as large an area as possible may be used for a tension stop (not shown).

To seal the piston rod seal 27 in the area of the casing 13, a first radial depression 41 is provided, in the form of a bead, which accommodates a seal 65. A second radial depression 43 is formed as a bead above the bead of the first radial depression 41 for sealing with regard to the working chamber of the piston-cylinder unit 1. At least part 67 of the wall of the cylinder 3 is deformed into the second radial depression 43, thus fixing the position of the piston rod guide 11 with respect to the cylinder 3.

Figure 3:
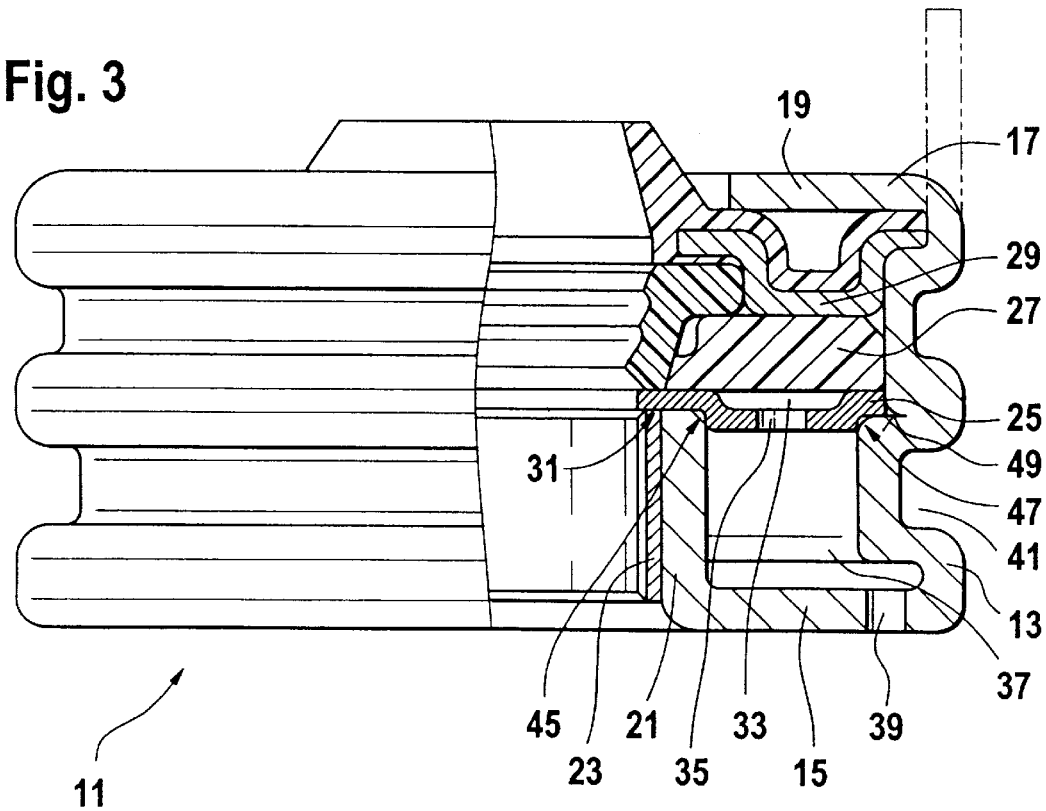
FIG. 3 shows a partial cross-sectional view of another embodiment of the piston rod guide of FIG. 1.

FIG. 3 shows a second embodiment of the piston rod guide 11' which differs from the piston rod guide 11 of FIG. 2 with regard to the design of the bearing ring 25'. The piston rod guide 11' of FIG. 3 comprises first and second annular shaped parts 60' and 62'. The first annular shaped part 60' forms the cover 19, the casing 13, the closure ring 15 and the guide sleeve 17, and the second annular shaped part 62' forms the bearing ring 25'. The principal advantage of this solution lies in the fact that the operation of forming the first annular shaped part 60' is simplified. Furthermore, the loading in the transverse direction is less than that in the axial direction, so that it is possible to use a reduced material thickness for the second annular shaped part 62' including the bearing ring 25' thereby using a small structural space and a reduced weight.

The guide sleeve 21 is supported in the radial direction by boundary surfaces 45, 47 of the channel 33 of the bearing ring 25'. The first radial depression 41 of the casing 13 in this case forms an outer rest plane 49 for the bearing ring 25'. The internal diameter of the bearing ring 25 is supported on an annular end face of the guide sleeve 21.

Figure 4:
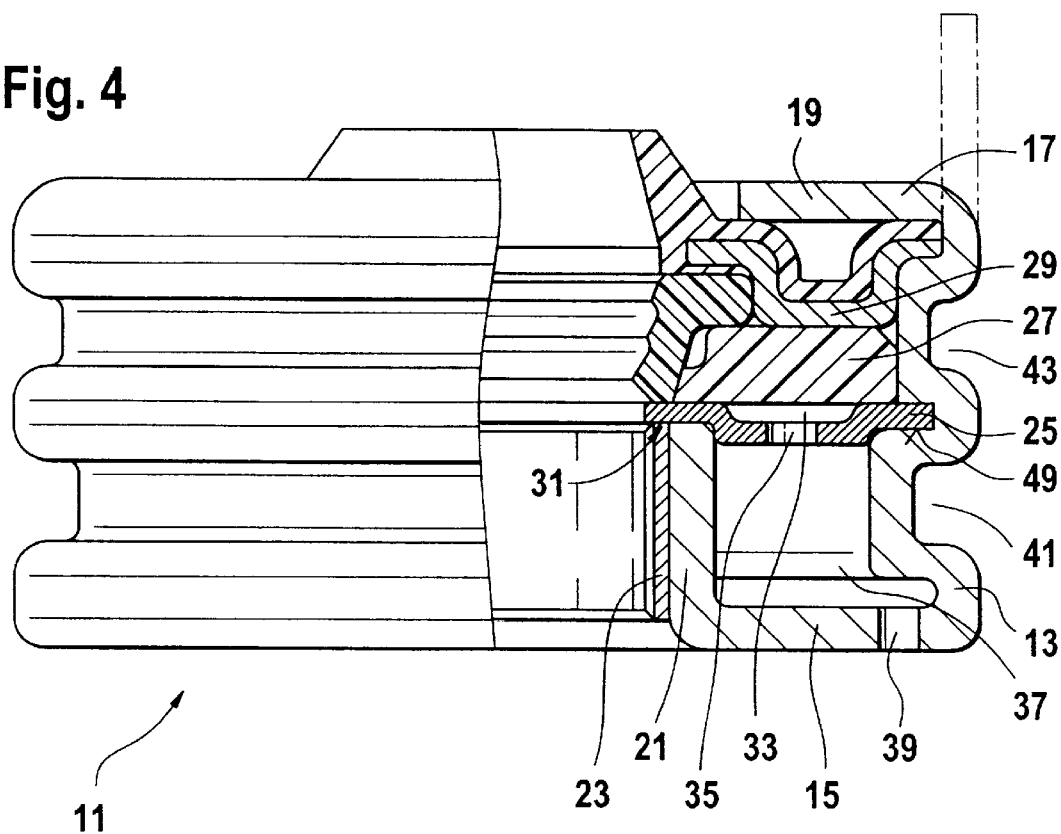
FIG. 4 shows a partial cross-sectional view of another embodiment of the piston rod guide of FIG. 1.

The embodiment in accordance with FIG. 4 builds on the solution shown in FIG. 3. The essential difference consists in the fact that the bearing ring 25" has a larger external diameter than that shown in FIG. 3, so that the second radial depression 43 of the casing 13 bears on the top side of the bearing ring 25" and thus braces the latter on the rest plane 49. As a result, the two annular shaped parts 60", 62" are securely connected even without the piston rod seal 27.

Figure 5:
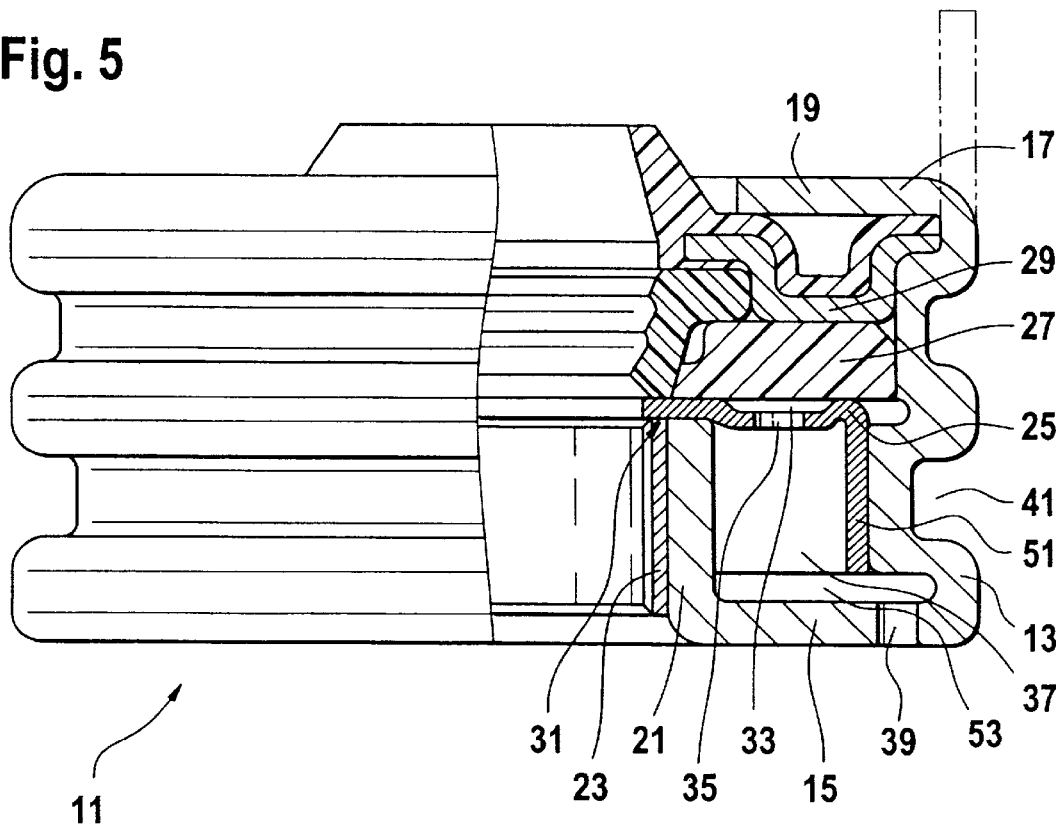
FIG. 5 shows a partial cross-sectional view of another embodiment of the piston rod guide of FIG. 1.

FIG. 5 shows a further modification of FIG. 3, the essential difference being that the bearing ring 25''' has a centering ring 51 supported in the radial direction on the internal diameter of the casing 13. The height of the centering ring 51 is less than the height of the guide sleeve 21 to avoid static overdetermination of the bearing points of the bearing ring 25'''. The result is a gap 53 between the bottom of the centering ring 51 and the closure ring 15, which allows the connection 39 to lie proximate a radially outer end of the closure ring 15. It is possible to dispense with the rest plane 49 in accordance with FIGS. 3 and 4, since the centering ring 51 exhibits a supporting action.

Figure 6:
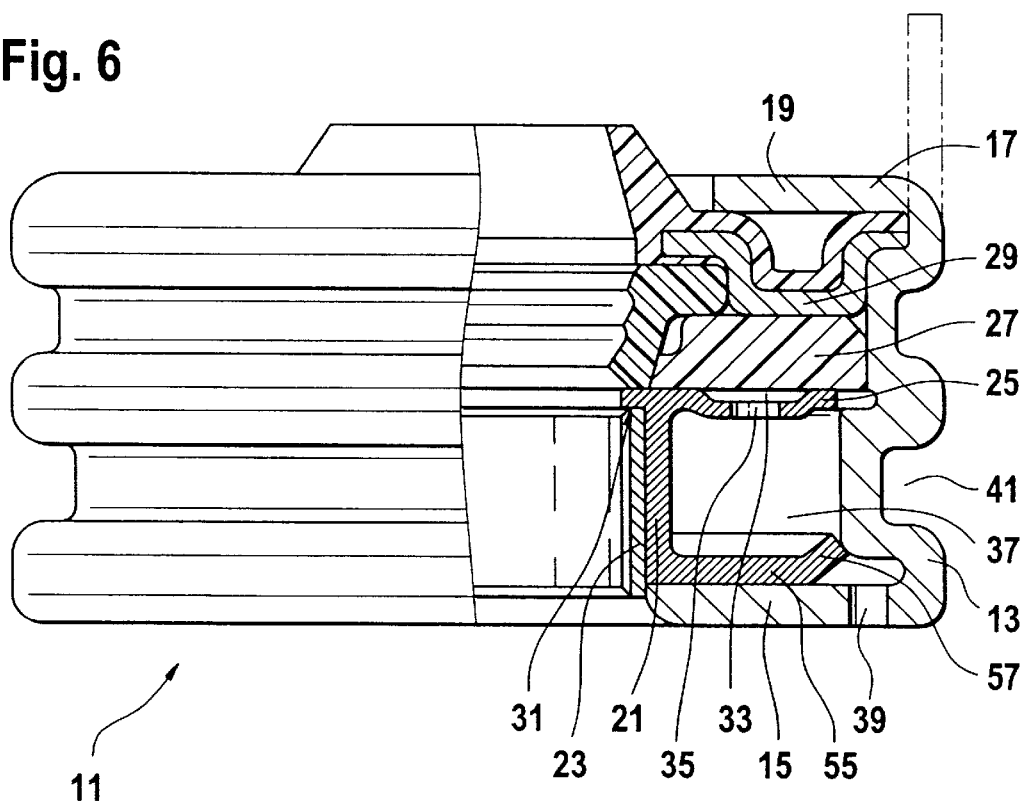
FIG. 6 shows a partial cross-sectional view of yet another embodiment of the piston rod guide of FIG. 1.

The embodiment of FIG. 6 shows a variant of FIG. 5 and is distinguished by the fact that the second annular shaped part 62"" has a U-shaped cross section containing the guide sleeve 21 and the bearing ring 25"". A side 55 of the second annular shaped part 62"", referred to below as support ring 55, bears against the top side of the closure ring 15. The external diameters of the bearing ring 25"" and of the support ring 55 are adapted in such a way that only one of the two has an external diameter having a supporting action on the inner wall of the casing 13. This arrangement prevents a skew position of the second annular shaped part 62"" caused by tolerance errors. In addition, the support ring 55 may have an angled-off section 57, for the support ring 55 to bear in the area of the depression, thus simplifying assembly.

In all the embodiments described, the assembly principle of the piston rod guide 11 is identical. In first forming steps, the first annular shaped part 60 is produced, with the cover 19 not as yet closed. Then, the second annular shaped part 62 is fitted into the first annular shaped part 60. In the fourth variation, the second radial depression 43 can only be made after this insertion. Then, the piston rod seal 27 is introduced. Finally, the cover 19 is bent onto the top side of the piston rod seal 27. The result is a closed structural unit into which the slide bush 23 is then also pressed.

The invention is not limited by the embodiments described above which are presented as examples only but can be modified in various ways within the scope of protection defined by the appended patent claims.

We claim:

1. A sheet-metal piston rod guide for a piston-cylinder unit in which a piston rod is axially movably arranged, said sheet-metal piston rod guide comprising:

a casing for centering said piston rod guide in the piston-cylinder unit in which said piston rod guide is to be arranged, said casing having a first axial end connected to an axially extending closure ring and a second axial end;

a guide sleeve adjoining a radially inner portion of said closure ring and a slide bush centered by said guide sleeve;

a piston rod seal for sealing a working chamber of the piston-cylinder unit in which said piston rod guide is to be arranged;

a bearing ring radially extending between said guide sleeve and said casing for axially and radially supporting said guide sleeve and bearing said piston rod seal, wherein an interconnection of said bearing ring, said casing, said closure ring and said guide sleeve comprises a closed force bearing arrangement of said piston rod guide; and first and second annular shaped parts, wherein said first annular shaped part comprises said closure ring, said casing, and said guide sleeve.

2. A sheet-metal piston rod guide for a piston-cylinder unit in which a piston rod is axially movably arranged, said sheet-metal piston rod guide comprising:

a casing for centering said piston rod guide in the piston-cylinder unit in which said piston rod guide is to be arranged, said casing having a first axial end connected to an axially extending closure ring and a second axial end;

a guide sleeve adjoining a radially inner portion of said closure ring and a slide bush centered by said guide sleeve;

a piston rod seal for sealing a working chamber of the piston-cylinder unit in which said piston rod guide is to be arranged;

a bearing ring radially extending between said guide sleeve and said casing for axially and radially supporting said guide sleeve and bearing said piston rod seal, wherein an interconnection of said bearing ring, said casing, said closure ring, and said guide sleeve comprises a closed force bearing arrangement of said piston rod guide: and first and second annular shaped parts, said second annular shaped part comprising said bearing ring and said bearing ring comprising an axially extending centering ring, and said first annular shaped part comprising said closure ring, said casing and said guide sleeve, said centering ring bearing against said casing of said first annular shaped part.

3. A sheet-metal piston rod guide for a piston-cylinder unit in which a piston rod is axially movably arranged, said sheet-metal piston rod guide comprising:

a casing for centering said piston rod guide in the piston-cylinder unit in which said piston rod guide is to be arranged, said casing having a first axial end connected to an axially extending closure ring and a second axial end;

a guide sleeve adjoining a radially inner portion of said closure ring and a slide bush centered by said guide sleeve;

a piston rod seal for sealing a working chamber of the piston-cylinder unit in which said piston rod guide is to be arranged;

a bearing ring radially extending between said guide sleeve and said casing for axially and radially supporting said guide sleeve and bearing said piston rod seal, wherein an interconnection of said bearing ring, said casing, said closure ring, and said guide sleeve comprises a closed force bearing arrangement of said piston rod guide; and first and second annular shaped parts, wherein said second annular shaped part comprises a U-shaped cross section having a first side forming said bearing ring and a second side forming said guide sleeve.

4. A sheet-metal piston rod guide for a piston-cylinder unit in which a piston rod is axially movably arranged, said sheet-metal piston rod guide comprising:

a casing for centering said piston rod guide in the piston-cylinder unit in which said piston rod guide is to be arranged, said casing having a first axial end connected to an axially extending closure ring and a second axial end;

a guide sleeve adjoining a radially inner portion of said closure ring and a slide bush centered by said guide sleeve;

a piston rod seal for sealing a working chamber of the piston-cylinder unit in which said piston rod guide is to be arranged;

a bearing ring radially extending between said guide sleeve and said casing for axially and radially supporting said guide sleeve and bearing said piston rod seal, wherein an interconnection of said bearing ring, said casing, said closure ring, and said guide sleeve comprises a closed force bearing arrangement of said piston rod guide; and first and second annular shaped parts, wherein said first annular shaped part comprises said closure ring, said casing, and the guide sleeve and said second annular shaped part comprises said bearing ring, said bearing ring being supported in the axial direction against said guide sleeve.

5. The piston rod guide of claim 4, wherein the second annular shaped part comprises an encircling channel comprising boundary surfaces which assume a centering function with respect to said guide sleeve of said first annular shaped part.

6. A sheet-metal piston rod guide for a piston-cylinder unit in which a piston rod is axially movably arranged, said sheet-metal piston rod guide comprising:

a casing for centering said piston rod guide in the piston-cylinder unit in which said piston rod guide is to be arranged, said casing having a first axial end connected to an axially extending closure ring and a second axial end;

a guide sleeve adjoining a radially inner portion of said closure ring and a slide bush centered by said guide sleeve;

a piston rod seal for sealing a working chamber of the piston-cylinder unit in which said piston rod guide is to be arranged;

a bearing ring radially extending between said guide sleeve and said casing for axially and radially supporting said guide sleeve and bearing said piston rod seal, wherein an interconnection of said bearing ring, said casing, said closure ring, and said guide sleeve comprises a closed force bearing arrangement of said piston rod guide; and first and second annular shaped parts, wherein said first annular shaped part comprises said casing and said casing comprises a first and second depressions directed radially inward, a rest plane being formed between said first and second depressions for receiving said second annular shaped part.

7. The piston rod guide of claim 6, wherein said first depression comprises a continuous bead.

8. The piston rod guide of claim 7, wherein said continuous bead accommodates a cylinder seal for sealing the working chamber of the piston-cylinder unit in which said piston rod guide is to be arranged.

9. The piston rod guide of claim 6, wherein said casing comprises a second depression which fixes the second annular shaped part on said rest plane of said first annular shaped part.

10. The piston rod guide of claim 9, wherein said second depression comprises a bead.

11. The piston rod guide as claimed in claim 10, wherein said second depression is arranged for receiving deformations in the wall of the cylinder of the piston-cylinder unit in which said piston rod guide is to be arranged for connecting said piston rod guide to the cylinder.

* * * * *